United States Patent [19]

Yano et al.

[11] Patent Number: 5,248,465
[45] Date of Patent: Sep. 28, 1993

[54] PREPARATION PROCESS OF HIGH-PERMITTIVITY MATERIAL

[75] Inventors: Shinsuke Yano; Takami Hirai, both of Nagoya, Japan

[73] Assignee: NGK Insulators, Ltd., Nagoya, Japan

[21] Appl. No.: 913,784

[22] Filed: Jun. 30, 1992

Related U.S. Application Data

[63] Continuation of Ser. No. 591,540, Sep. 14, 1990, abandoned.

[30] Foreign Application Priority Data

Sep. 20, 1989 [JP] Japan .................................. 1-244512

[51] Int. Cl.$^5$ ............................................ C04B 35/64
[52] U.S. Cl. ........................................ 264/65; 264/66; 264/82; 264/570; 264/61
[58] Field of Search ........................ 264/65, 61, 66, 82, 264/570

[56] References Cited

U.S. PATENT DOCUMENTS

| | | | |
|---|---|---|---|
| 3,853,973 | 12/1974 | Härdtl | 264/65 |
| 4,816,072 | 3/1989 | Harley et al. | 501/12 |
| 5,039,464 | 8/1991 | Wank | 264/65 |

*Primary Examiner*—James Derrington
*Attorney, Agent, or Firm*—Shea & Gould

[57] ABSTRACT

Disclosed herein is a process for the preparation of a high-permittivity material. The process comprises precalcining a ceramic material under a predetermined pressure to obtain a sintered body, and then subjecting the sintered body to a hot isostatic pressing treatment in an oxidizing atmosphere. The high-permittivity material is low in void content, is very small in dispersion of its dielectric constant and hence has excellent dielectric properties.

5 Claims, No Drawings

PREPARATION PROCESS OF HIGH-PERMITTIVITY MATERIAL

This application is a continuation of application Ser. No. 591,540 filed Sep. 14, 1990 now abandoned.

BACKGROUND OF THE INVENTION

1) Field of the Invention

The present invention relates to a process for the preparation of a high-permittivity material, and more specifically to a process for the preparation of a high-permittivity material suitable for use as, for example, a microwave dielectric resonator or a substrate for a microwave integrated circuit.

2) Description of the Related Art

With increase of information contents through communications, communication means through microwave are rapidly advanced in fields of mobile telephone systems, satellite communications, satellite broadcasts and the like. Parts used in these communication means are required to enhance their performance, make their dimensions small and reduce their prices.

In this case, regarding microwave dielectric resonators making use of a ceramic material by way of example, the wavelength of the electromagnetic wave propagated through the interior thereof is shortened in proportion to $1/\sqrt{\epsilon_r}$ ($\epsilon_r$: relative dielectric constant) compared with that through air. Therefore, such resonators can be made in a small size compared with cavity resonators and hence have been extensively used in recent years. Besides, the ceramic material used therein has also been used as a substrate for microwave integrated circuits owing to its high relative dielectric constant and low dielectric loss.

A material for a microwave dielectric resonator must meet requirements such as a high dielectric constant, low dielectric loss and a low temperature coefficient of resonant frequency. As materials satisfying such requirements, there are known those of the $BaO\text{-}TiO_2$-type, $SnO_2\text{-}ZrO_2\text{-}TiO_2$ type, $BaO\text{-}TiO_2\text{-}Nd_2O_3$ type and complex perovskite type typified by $Ba(Mg_{\frac{1}{3}}Ta_{\frac{2}{3}})O_3$ and $Ba(Zn_{\frac{1}{3}}Ta_{\frac{2}{3}})O_3$.

In general, dielectrics making separate use of the above-mentioned materials are sintered bodies obtained by a firing process under atmospheric pressure and hence have voids in their interiors in proportions of several % in terms of volume. In this case, the proportion of the voids contained inside the sintered body (void content) is affected by the firing temperature, the particle size of raw materials for the ceramic, impurities, etc. Therefore, the void content often varies depending upon the production lots and firing lots of a raw material. Even in the same lot, the values of the void content tend to vary depending upon the firing positions of the raw material because of temperature and atmosphere distributions in a kiln. Accordingly, it is difficult to obtain a dielectric having stable properties.

In the dielectric resonator on the other hand, its resonance frequency is determined by the dielectric constant of its material, and dimensions and configuration characteristic of its resonator. In this case, it is desirable that the dispersion in resonant frequency between dielectric resonators should be as small as possible. However, since there are variations of void content in the dielectric obtained in the above-described manner and the relative dielectric constant (about 1) of air present in the voids is very low compared with that (10–100) of the ceramic material, great dispersion in dielectric constant occurs and hence the resonance frequency is also dispersed widely, so that the yield of the dielectric resonators is reduced to a significant extent. In a microwave band, high accuracy for a desired resonance frequency is often required, in particular, of the SHF band (3 GHz or higher higher in frequency). There is hence a great problem therein. Therefore, in order to avoid such disadvantages, additional processes, for example, a process in which the dimensions of individual dielectrics are changed to fabricate resonators having the same resonance frequency, are required.

In the case of the substrate for a microwave integrated circuit on the other hand, its thickness must be made even in order to make the dispersion of characteristic impedance as to wiring smaller. In addition, since the wiring is composed of a thin film formed by sputtering, vapor deposition, plating or the like, the substrate must be polished prior to its use. In this case, when the voids present inside the substrate appear on the surface thereof to turn into pores, any minute patterns cannot be formed on the surface. In particular, when a material high in dielectric constant is used, a minute pattern must be formed due to the problem of characteristic impedance. Therefore, the presence of voids become a great problem.

As means for reducing the void content of a ceramic material, are known hot pressing and hot isostatic pressing (HIP). However, these methods are accompanied by great problems because ceramic materials for microwave dielectric resonators, which have been known to date, are all oxides.

Namely, with respect to the hot pressing, the firing temperature can be raised only to about 1,300° C. from the viewpoint of heat resistance of a jig. Therefore, materials allowed to fire at such a temperature are limited, and moreover such a method is not suitable for mass production, so that production cost becomes expensive. With respect to HIP on the other hand, a relatively large amount of the material can be treated. However, such a treatment is accompanied by a problem that since the treatment is principally conducted in a non-oxidizing atmosphere such as $N_2$ or Ar, ceramic dielectrics which are oxides are reduced when applying such a treatment thereto, so that the dielectric loss of the dielectrics is remarkably deteriorated.

SUMMARY OF THE INVENTION

A principal object of this invention is to provide a process for the preparation of a high-permittivity material in which the void content has been made low without any deterioration of the dielectric loss and the dispersion of the dielectric constant is small, thereby becoming effective in the SHF band of 3 GHz or higher.

Another object of this invention is to provide a process for the preparation of a high-permittivity material, which comprises:

Pre-firing a ceramic material under a predetermined pressure to obtain a sintered body; and then subjecting the sintered body to a hot isostatic pressing treatment in an oxidizing atmosphere.

A further object of this invention is to provide a process for the preparation of a high-permittivity material, wherein the void content of the sintered body is controlled to 6% or less in the pre-firing.

A still further object of this invention is to provide a process for the preparation of a high-permittivity material, wherein the ceramic material is pre-firing under a pressure of 100 atm or lower.

A yet still further object of this invention is to provide a process for the preparation of a high-permittivity material, wherein powder obtained from a solution of a metal salt is used as the ceramic material.

A yet still further object of this invention is to provide a process for the preparation of a high-permittivity material, wherein the sintered body is subjected to the hot isostatic pressing treatment under a pressure of at least 200 atm, but at most 3000 atm.

A yet still further object of this invention is to provide a process for the preparation of a high-permittivity material, wherein the sintered body is subjected to the hot isostatic pressing treatment at a temperature ranging from $-350°$ C. to $+100°$ C. on the basis of the pre-firing temperature.

Other objects and advantages of the present invention will be readily appreciated from the preferred embodiments of this invention, which will be described subsequently in detail.

DETAILED DESCRIPTION OF THE PREFERRED EMBODIMENTS

In the present invention, a ceramic material is first of all pre-fired in a pressurized atmosphere up to about 100 atm, or under atmospheric pressure or reduced pressure. By this pre-firing, opened pores extending to the interior of the ceramic material are lost to form an airtight surface layer. Incidentally, although the opened pores are lost by the pre-firing, a considerable number of closed voids are present in the ceramic material. The thus-fired ceramic material is then subjected to a high-temperature and high-pressure treatment, i.e., HIP treatment, in an oxidizing atmosphere to decrease the closed voids, thereby preparing a ceramic material low in void content. In this case, the starting ceramic material must be compacted to a relative density of at least 94% in order to lose the opened pores by the pre-firing.

The above-described steps are conducted, for example, by separately using both kilns for pre-firing in a decompressed, normal-pressure or pressurized atmosphere and for the HIP. Needless to say, the pre-firing and HIP steps may be successively performed in an HIP apparatus.

Although those of the $BaO-TiO_2$ type, $SnO_2-ZrO_2-TiO_2$ type, $BaO-TiO_2-Nd_2O_3$ type and complex perovskite type typified by $Ba(Mg_{\frac{1}{3}}Ta_{\frac{2}{3}})O_3$ and $Ba(Zn_{\frac{1}{3}}Ta_{\frac{2}{3}})O_3$ may of course be mentioned as materials for microwave dielectric resonators, which may be used in Examples of this invention, those obtained by adding one or more additives to the above materials and hence having improved properties are also applied. In principle, all oxides can be applied so long as they are usable for microwave.

Any materials may be used as raw materials for individual components of the oxide ceramics so long as they are ordinary oxides and those finally converted into their corresponding oxides, such as carbonates. However, powders obtained from solutions of metal salts, namely, raw materials obtained by coprecipitation, or hydrolysis or spray pyrolysis of metal alkoxides are extremely preferred because of their high purities. In particular, since these powders are very fine particles, lower-temperature sintering can be conducted for them. By combining it with similar lower-temperature sintering expectable in HIP, the powders can be fired at lower temperatures. Therefore, materials liable to be reduced at elevated temperatures even in an oxidizing atmosphere can be fired at lower temperatures, and moreover a superstructure by which dielectric loss property can be improved in the above-mentioned complex perovskites also becomes more easily obtainable by lower-temperature firing.

For the oxide microwave dielectrics susceptible to the deterioration of dielectric loss due to reduction and deficiency of oxygen ions, the remarkable increase of the partial pressure of oxygen by the high-pressure firing brings about the following advantages. Namely, the occurrence of these defects can be prevented, the reduction of their qualities can be avoided, and moreover their properties can be improved.

Conditions of the HIP treatment vary depending upon the composition of a ceramic material, the particle size of powders as raw materials and the like. It is however desirable that the pressure should be at least 200 atm, but at most 3000 atm. Any pressures lower than 200 atm will be able to attain only a little effects. On the other hand, any pressures higher than 3000 atm will be too expensive as to the cost of equipment for withstanding such pressures in comparison with effects obtained.

The temperature of the HIP treatment desirably falls in a range of from $-350°$ C. to $+100°$ C. on the basis of the pre-firing temperature (usually, a firing temperature at which the powder is most compacted under atmospheric pressure). Any temperatures lower than the firing temperature $-350°$ C. will be difficult to demonstrate the effect of the HIP due to low deformability of the ceramic material. Any temperatures higher than the calcining temperature $+100°$ C. will result in a product having deteriorated properties due to overfiring.

COMPARATIVE EXAMPLE 1

After mixing 35.4 g of $BaCO_3$, 64.6 g of $TiO_2$ and 0.2 g of $MnCO_3$ in a wet ball mill making use of a polyethylene pot and zirconia balls, the resulting mixture was filtered under reduced pressure and dried at 110° C. After the thus dried mixture was then fired at 1,000° C. in an air atmosphere, the thus-treated mixture was ground in a wet ball mill making use of a polyethylene pot and zirconia balls. The thus-ground mixture was further filtered under reduced pressure and dried at 110° C., followed by addition of an organic binder to granulate it to 40 mesh. The thus-granulated powder was pressed into disk in a steel die single-shaft dry powder-press molding under a pressure of 200 kg/cm² and then iso-static-pressed under a pressure of 1,200 kg/cm². The resulting molded article was fired for 2 hours at 1,380° C. on a platinum plate in an oxygen atmosphere. The main crystal of the resulting sintered body was $Ba_2Ti_9O_{20}$. This sintered body was machined into pieces of 7 mm in diameter and 3.5 mm in thickness.

The dielectric properties of the above sintered body at microwave were determined in accordance with the HakKi & Coleman method. As a result, its relative dielectric constant, $\epsilon_4$ and Q (the reciprocal of dielectric loss, tan $\delta$) were found to be 39.4 and 3,500, respectively, at about 10 GHz. Further, the sintered body was polished to observe it. Its void content was about 2% and the dispersion of the relative dielectric constant, $\epsilon_r$ was about $\pm 0.2$ as determined as to 10 samples.

EXAMPLE 1

The sintered body obtained in Comparative Example 1 was subjected to an HIP treatment for 1 hour at 1320° C. and 1,500 atm in an atmosphere composed of 20 vol % of $O_2$ and 80 vol % of argon. Thereafter, the relative dielectric constant, $\epsilon_r$ of the HIP-treated sintered body was measured and was found to be 40.6. The dispersion of the relative dielectric constant, $\epsilon_r$ was ±0.1 or less. Besides, voids were scarcely observed.

EXAMPLE 2

Powder obtained by refluxing alkoxides of barium, titanium and manganese, which had been separately weighed so as to have the same final composition as that in Comparative Example 1, in alcohol as a solvent and then hydrolyzing them was fired at 900° C. After adding an organic binder to the thus-treated powder, the resulting mixture was molded by the same procedure as in Comparative Example 1. After the organic binder was removed at 900° C., the molded article was pre-fired for 2 hours at 1,320° C. on a platinum plate in an atmosphere composed of 20 vol % of $O_2$ and 80 vol % of argon, followed by an HIP treatment under 1,000 atm. This sintered body was machined into pieces of 8 mm in diameter and 4 mm in thickness.

The dielectric properties of the above sintered body at microwave were determined. As a result, its $\epsilon_r$ and Q were found to be 40.5 and 3,200, respectively, at about 10 GHz. The dispersion of the $\epsilon_r$ was ±0.1 or less. Besides, voids were scarcely observed.

COMPARATIVE EXAMPLE 2

A mixture of 55.1 g of $BaCO_3$, 3.8 g of MgO, 41.1 g of $Ta_2O_5$ and 0.1 g of $MnCO_3$ was treated in the same manner as in Comparative Example 1 except that the firing was conducted at 1,100° C. to complete the steps from the mixing to the molding. The thus-obtained molded article was fired for 3 hours at 1,520° C. on a platinum plate in an oxygen atmosphere. The main crystal of the resulting sintered body was $Ba(Mh_{\frac{1}{3}}Ta_{\frac{2}{3}})O_3$ of a composite perovskite structure. The dielectric properties of the above sintered body at microwave were determined. As a result, its $\epsilon_r$ and Q were found to be 24.5 and 7,200, respectively, at about 10 GHz. Besides, its void content was about 1.5% and the dispersion of the $\epsilon_r$ was ±0.2 as determined as to 10 samples.

EXAMPLE 3

The sintered body obtained in Comparative Example 2 was subjected to an HIP treatment for 1 hour at 1450° C. and 1,000 atm in an atmosphere composed of 20 vol % of $O_2$ and 80 vol % of argon. Thereafter, the relative dielectric constant, $\epsilon_r$ of the HIP-treated sintered body was measured and was found to be 25.3. The dispersion of the $\epsilon_r$ was ±0.1 or less. Besides, voids were scarcely observed.

COMPARATIVE EXAMPLE 3

After weighing $BaCO_3$, $TiO_2$ and $Nd_2O_3$ to predetermined amounts, the mixture was treated in the same manner as in Comparative Example 1 to complete the steps from the mixing to the molding. The thus-obtained molded article was calcined for 2 hours at 1,350° C. in an oxygen atmosphere. This sintered body was machined into pieces of 9 mm in diameter and 4.5 mm in thickness. The dielectric properties of the above sintered body at microwave were determined. As a result, its $\epsilon_r$ and Q were found to be 83 and 1,600, respectively, at about 6 GHz. Besides, its void content was about 2%. The dispersion of the $\epsilon_r$ was ±0.3 as determined as to 10 samples.

EXAMPLE 4

The sintered body obtained in Comparative Example 3 was subjected to an HIP treatment for 2 hours at 1300° C. and 500 atm in an atmosphere composed of 20 vol % of $O_2$ and 80 vol % of argon. Thereafter, the $\epsilon_r$ of the HIP-treated sintered body was measured and was found to be 85. The dispersion of the $\epsilon_r$ was ±0.1 or less. Besides, voids were scarcely observed.

COMPARATIVE EXAMPLE 4

The sintered bodies described in Examples 1 through 4 were separately subjected to an HIP treatment under the same conditions as those in the above respective HIP treatments except that an argon atmosphere was used instead of the oxidizing atmosphere. In this case, the sintered bodies in all Examples were reduced and their Q values were lowered to a significant extent.

As has been described above, the high-permittivity materials obtained in accordance with this invention have a low void content, so that the dispersion of their dielectric constants is very small compared with any conventional preparation processes. Therefore, the dielectric resonators obtained by using the high-permittivity materials according to this invention are very small in dispersion of resonance frequency. It is hence possible to mass-produce dielectric resonators having uniform properties. In addition, since pores scarcely appear in the high-permittivity materials of this invention even after the polishing them, they are also optimum as substrates for microwave integrated circuits.

We claim:

1. A process for manufacturing a dielectric material for a microwave dielectric resonator and a substrate for a microwave integrated circuit comprising the steps of:
    pre-firing an oxide ceramic material responsive in the microwave range and selected from the group consisting of $Ba_2Ti_9O_{20}$, a $SnO_2$-$ZrO_2$-$TiO_2$ system, a $BaO$-$TiO_2$-$Nd_2O_3$ system, $Ba(Mg_{\frac{1}{3}}Ta_{\frac{2}{3}})O_3$, and $Ba(Zn_{\frac{1}{3}}Ta_{\frac{2}{3}})O_3$ under a predetermined pressure to obtain a sintered body; and then
    subjecting the sintered body to a hot isostatic pressing treatment in an oxidizing atmosphere of at least 20 vol % and under a pressure of at least 500 atm, and at most 3000 atm.

2. A process as claimed in claim 1, wherein the void content of the sintered body is controlled to 6% or less in the pre-firing.

3. A process as claimed in claim 1, wherein the ceramic material is pre-fired under a pressure of 100 atm or lower.

4. A process as claimed in claim 1, wherein powder obtained from a solution of a metal salt is used as the ceramic material.

5. A process as claimed in claim 1, wherein the sintered body is subjected to the hot isostatic pressing treatment at a temperature ranging from −350° C. to +100° C. on the basis of the pre-firing temperature.

* * * * *